(12) United States Patent
Wobbe et al.

(10) Patent No.: US 7,075,753 B2
(45) Date of Patent: Jul. 11, 2006

(54) CLEAN SUSPENSION ASSEMBLY

(75) Inventors: David G. Wobbe, Jordan, MN (US); Zine-Eddine Boutaghou, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 259 days.

(21) Appl. No.: 10/737,494

(22) Filed: Dec. 16, 2003

(65) Prior Publication Data

US 2005/0128643 A1 Jun. 16, 2005

(51) Int. Cl.
*G11B 17/32* (2006.01)

(52) U.S. Cl. .................................. 360/244.2
(58) Field of Classification Search ............. 360/244.2, 360/97.02, 265.7, 265.9, 266
See application file for complete search history.

(56) References Cited

U.S. PATENT DOCUMENTS

| | | | |
|---|---|---|---|
| 4,888,655 A | 12/1989 | Bonn | |
| 5,406,431 A | 4/1995 | Beecroft | |
| 5,490,025 A | 2/1996 | Dorius et al. | |
| 5,602,700 A * | 2/1997 | Viskochil et al. | 360/256.1 |
| 5,801,905 A * | 9/1998 | Schirle et al. | 360/265.9 |
| 5,854,725 A | 12/1998 | Lee | |
| 6,296,691 B1 * | 10/2001 | Gidumal | 96/17 |
| 6,466,411 B1 * | 10/2002 | Kazama | 360/244.2 |
| 6,570,742 B1 | 5/2003 | Korkowski et al. | |
| 6,665,150 B1 * | 12/2003 | Smith | 360/265.7 |
| 6,980,392 B1 * | 12/2005 | Pierson | 360/97.02 |
| 2002/0075599 A1 | 6/2002 | Rao et al. | |
| 2002/0085473 A1 * | 7/2002 | Kim et al. | 369/71 |
| 2002/0089790 A1 | 7/2002 | Stoebe et al. | |
| 2002/0186512 A1 * | 12/2002 | Kubotera et al. | 360/266 |
| 2003/0039075 A1 | 2/2003 | Rao et al. | |
| 2005/0030664 A1 * | 2/2005 | Shin | 360/97.02 |

OTHER PUBLICATIONS

Naozumi Tsuda et al., "Study of Aerodynamic Vibration Mechanism of HDD Arms with Unsteady Analysis and its Experimental Verification," *Digest of the Asia Pacific Magnetic Recording Conference* (2002).

* cited by examiner

*Primary Examiner*—Allen Cao
(74) *Attorney, Agent, or Firm*—Kinney & Lange, P.A.

(57) ABSTRACT

A clean suspension assembly for capturing particles carried by airflow along the suspension assembly includes an opening formed in the suspension assembly, and a particle capture device attached to the suspension assembly. In a further embodiment, the suspension assembly also includes a deflector located adjacent the opening.

24 Claims, 7 Drawing Sheets

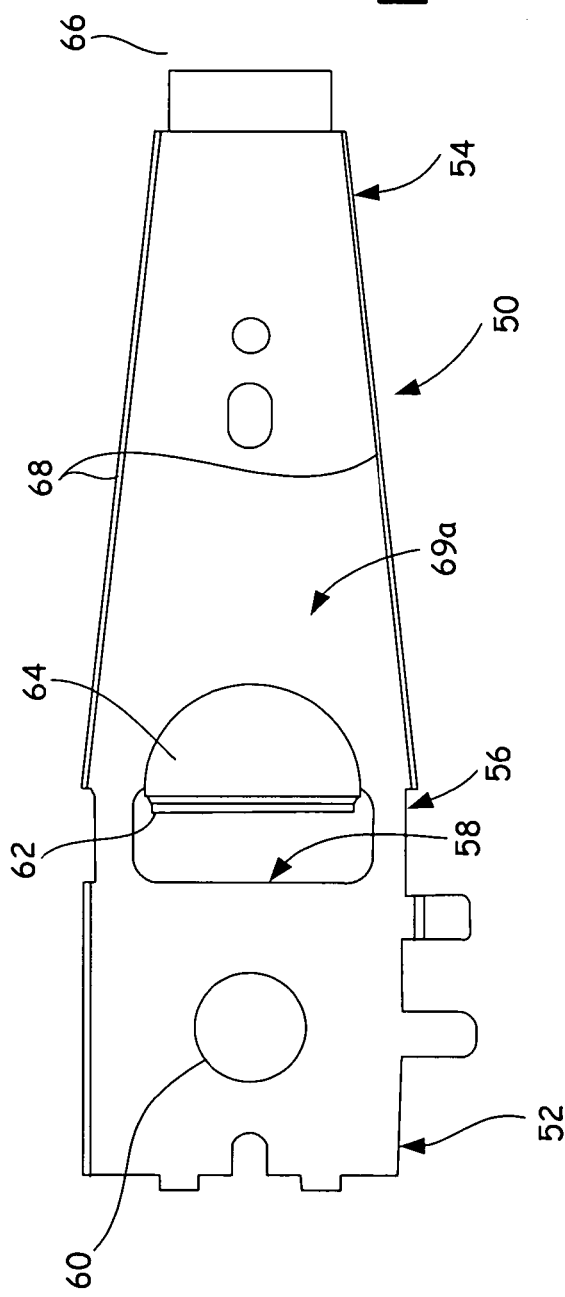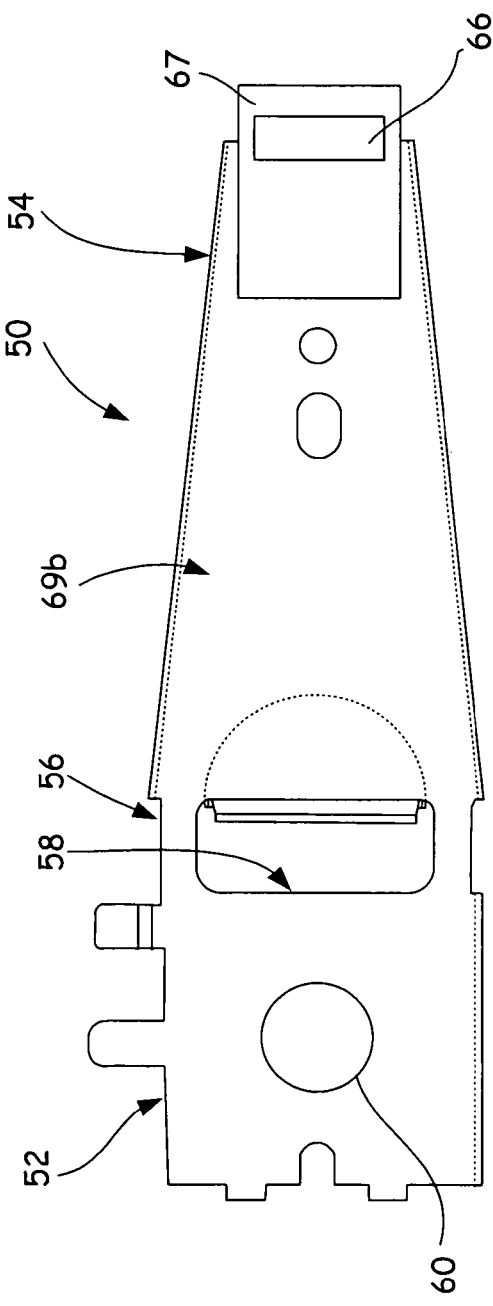

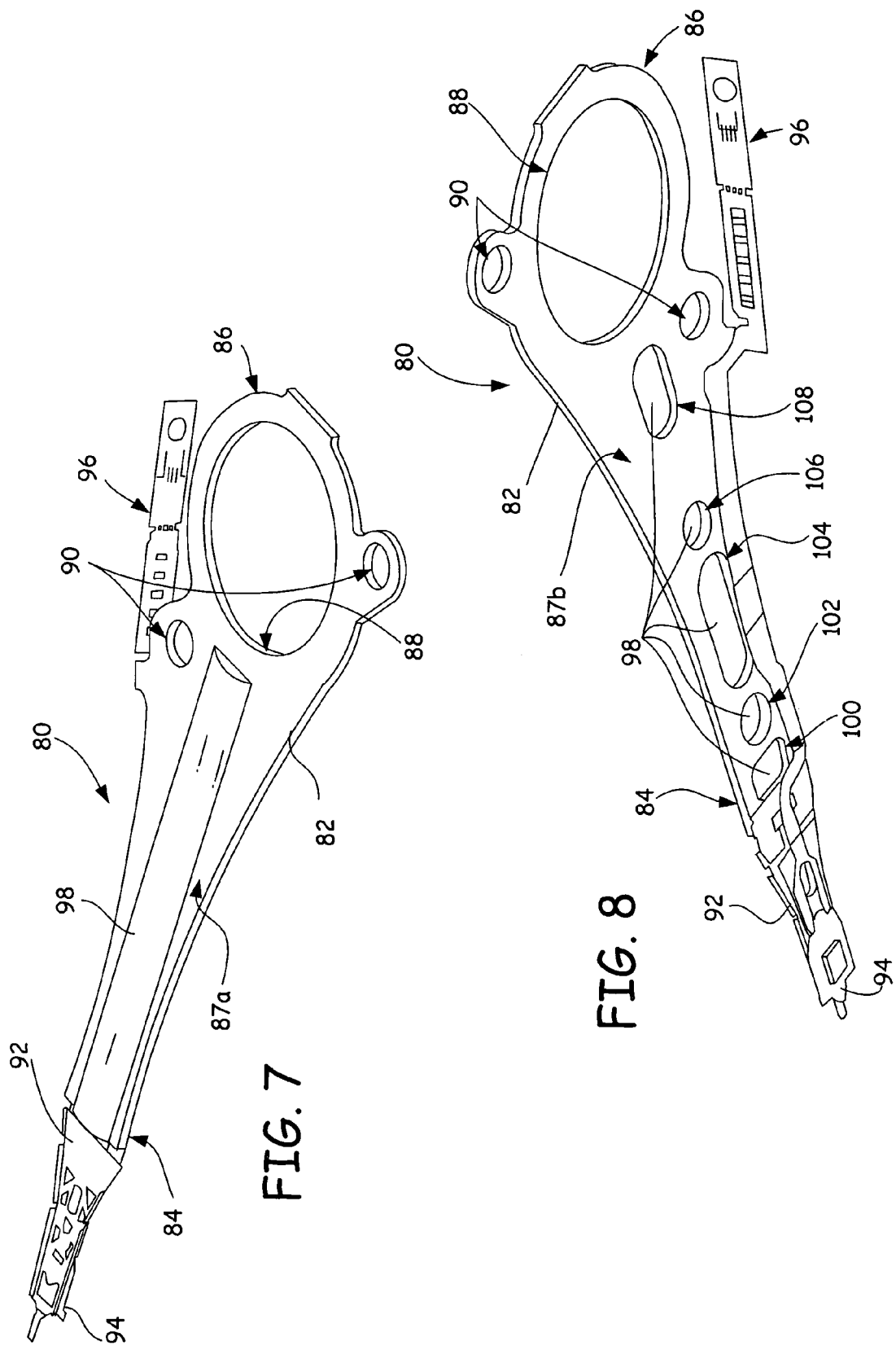

CLEAN SUSPENSION ASSEMBLY

BACKGROUND OF THE INVENTION

The present invention relates to data storage and retrieval systems, and more particularly to a suspension system having a particle capture device.

Hard Disc Drives (HDDs) are well known in the art and comprise a housing that contains a storage medium and a suspension assembly. Generally the storage medium is in the form of one or more rotatable discs, each disc having numerous concentric data tracks on each side of the disc for storing data in the form of localized magnetic fields. When multiple discs are used, a stack is formed of coaxial discs having generally the same diameter. This stack is connected to a spindle, which can rotate the discs simultaneously.

The suspension assembly includes an actuator arm and a head gimbal assembly (HGA), which support and position a transducing head over the disc. The transducing head is used to read and/or write to the data tracks. The transducing head is supported by the HGA, which, in turn, is supported by the actuator arm.

The actuator arm is rigid and rotatable about an axis. A large scale arm actuation motor, such as a voice coil motor (VCM), is used to rotate the actuator arm about an axis. The VCM moves the arm when electrical signals are sent to a VCM coil attached to the actuator arm. The signals induce movements with respect to fields created by permanent magnets located in the HDD housing. A plurality of actuator arms disposed next to a stack of discs may be connected to a common E-block, which allows common rotation of the actuator arms.

A standard HGA comprises a base plate, a load beam, a gimbal, a flexible interconnect circuit, and a slider. The load beam provides the main support structure for the HGA. The load beam is connected to the base plate, and the base plate is swaged to the actuator arm. Opposite the base plate, the load beam is connected to the gimbal. The gimbal and base plate are each attached to the load beam by methods known to the art, such as spot welding. Alternative HGA configurations have two base plates connected to opposing sides of the load beam. Still other HGA configurations have no base plate, and the load beam is attached directly to the actuator arm.

The load beam and the actuator arm generally have one or more openings along their length. These openings reduce the amount of material used in constructing the load beam and the actuator arm, thereby reducing the mass of the suspension assembly. Reduction of the mass of the suspension assembly facilitates positioning the HGA above a selected data track on the disc by lessening the load moved by the VCM.

The HGA is positioned relative to a surface of the disc. To better position the HGA near the surface of the disc, the load beam is typically bent towards the disc. This positions the gimbal and slider closer to the surface of the disc than if the load beam extended straight from the actuator arm.

Furthermore, the HGA is movably positioned above different tracks located between an outer diameter and an inner diameter of the disc. The rotational movement of the actuator arm allows the attached HGA to make arc-shaped movements relative to the disc. These arc-shaped movements allow quasi-radial positioning of the HGA to access selected data tracks on the disc.

The slider is the portion of the HGA positioned over a selected data track of the disc. The slider is supported by the gimbal. The gimbal is designed to flex, allowing the slider to follow the surface of the disc more closely then if the slider were mounted directly on the load beam. The flexure of the gimbal thus provides a biasing force to position the slider close to the disc. The slider carries a transducing head for reading and/or writing to the selected data track. The transducing head may include a magnetoresistive (MR) read element as well as a write coil.

The flexible interconnect circuit electrically connects the transducing head with components located on or near the actuator arm. Leads and traces on the flexible interconnect circuit allow electronic signals to travel from the transducing head to a pre-amp that amplifies the minimal signal from the head so the disc drive can read the data signal.

In operation, rotation of the disc produces an airflow that generally co-rotates with the disc. The aerodynamically shaped slider has an air bearing surface (ABS). The interaction of the airflow and the ABS causes the slider to "fly" a small distance above the surface of the disc on a cushion of air. At the same time, the biasing force provided by the gimbal holds the slider near the disc surface. Thus, the transducing head is held a substantially constant distance above the surface of the disc for reading and/or writing to the data tracks.

While efforts are made to prevent contaminants from entering the HDD housing during fabrication and operation, particles or other contaminants can be present in airflows. Hence, airflow along the load beam may carry one or more particles. These particles can attach themselves to portions of the HGA, thereby contaminating surfaces of the HGA. Such contamination is undesirable. In particular, a downbeam airflow may travel along the length of the load beam carrying particles. The particles may collect on portions of the slider and/or the gimbal. Over time, the particles that have collected on the slider or gimbal can migrate, influenced by gravity, windage, operating shock, and/or shock vibration, to the ABS. Contamination of the ABS interferes with the operation of the HDD. Debris on the ABS, in the form of built up particle contamination, can cause unstable slider flight. Contamination of the ABS can also reduce or destroy the functioning of the transducing head. Additionally, contaminates on the ABS can act as an abrasive that scratches the magnetic layer of the disc, thereby destroying the capacity for the disc to retain data. Therefore, contamination of the ABS can lead to errors in the operation of the HDD.

Known in the art are recirculating (or recirculation) filters placed in the HDD housing to collect airborne particles. Such recirculating filters are provided within the HDD housing away from the suspension assembly. For example, Beecroft, U.S. Pat. No. 5,406,431, teaches a recirculating filter disposed in a HDD housing on an opposite side of the disc from the actuator arm assembly. While a recirculating filter can remove some particles present in HDD airflows, such a recirculating filter is located far from the HGA. Thus, the recirculating filter may not eliminate contamination of the ABS because airflow containing particulate contaminants may contact the HGA before the airflow passes through the recirculating filter.

Other known systems attempt to reduce contamination of the ABS without providing a filter. One example is a gimbal tongue shaped to direct particles away from the slider in order to avoid contaminant buildup on the HGA. However, such a design does not include a means for capturing the particles to reduce the number of particles traveling near the HGA, where the particles can attach themselves and potentially migrate to the ABS.

Another problem encountered in prior HDD designs is excitation of the HGA due to asymmetric airflows. As rotation of the disc generates an airflow co-rotating with the disc, the airflow pattern is generally symmetrical. However, as the airflow travels near the load beam, the openings in the load beam may generate turbulence in the form of eddies, periodic spiral vortices, or other asymmetric airflow patterns. These asymmetric airflows exists in three dimensions, and can influence airflows in a wake region, the wake region being adjacent to and downstream of the load beam. This turbulence generated by the airflow at the openings on the load beam can cause excitation of the load beam, and in turn, excitation of the entire HGA. Undesirable off-track movements can result from excitation of the HGA, leading to drive errors. It is well-known that a structure with no holes performs better in regards to windage excitation due to the reduction or elimination of eddies around the openings. However, elimination of mass-saving holes on the load beam is undesirable because it increases the mass of the load beam.

Thus, a suspension assembly is needed to reduce errors in HDD systems by reducing windage-induced vibrations in the HGA without significantly increasing the mass of the HGA, and by capturing particles carried by airflow along the HGA.

BRIEF SUMMARY OF THE INVENTION

A clean suspension assembly for capturing particles carried by airflow along the suspension assembly includes an opening formed in the suspension assembly, and a particle capture device attached to the suspension assembly. In a further embodiment, the suspension assembly also includes a deflector located adjacent the opening.

BRIEF DESCRIPTION OF THE DRAWINGS

FIG. 5 is atop view of the portion of the suspension assembly shown in FIG. 2.

FIG. 6 is a bottom view of the portion of the suspension assembly shown in FIG. 2.

FIG. 7 is a top perspective view showing another embodiment of a portion of a suspension assembly.

FIG. 8 is a bottom perspective view from the bottom showing an alternate embodiment of the portion of the suspension assembly shown in FIG. 7.

DETAILED DESCRIPTION

Figure 1:
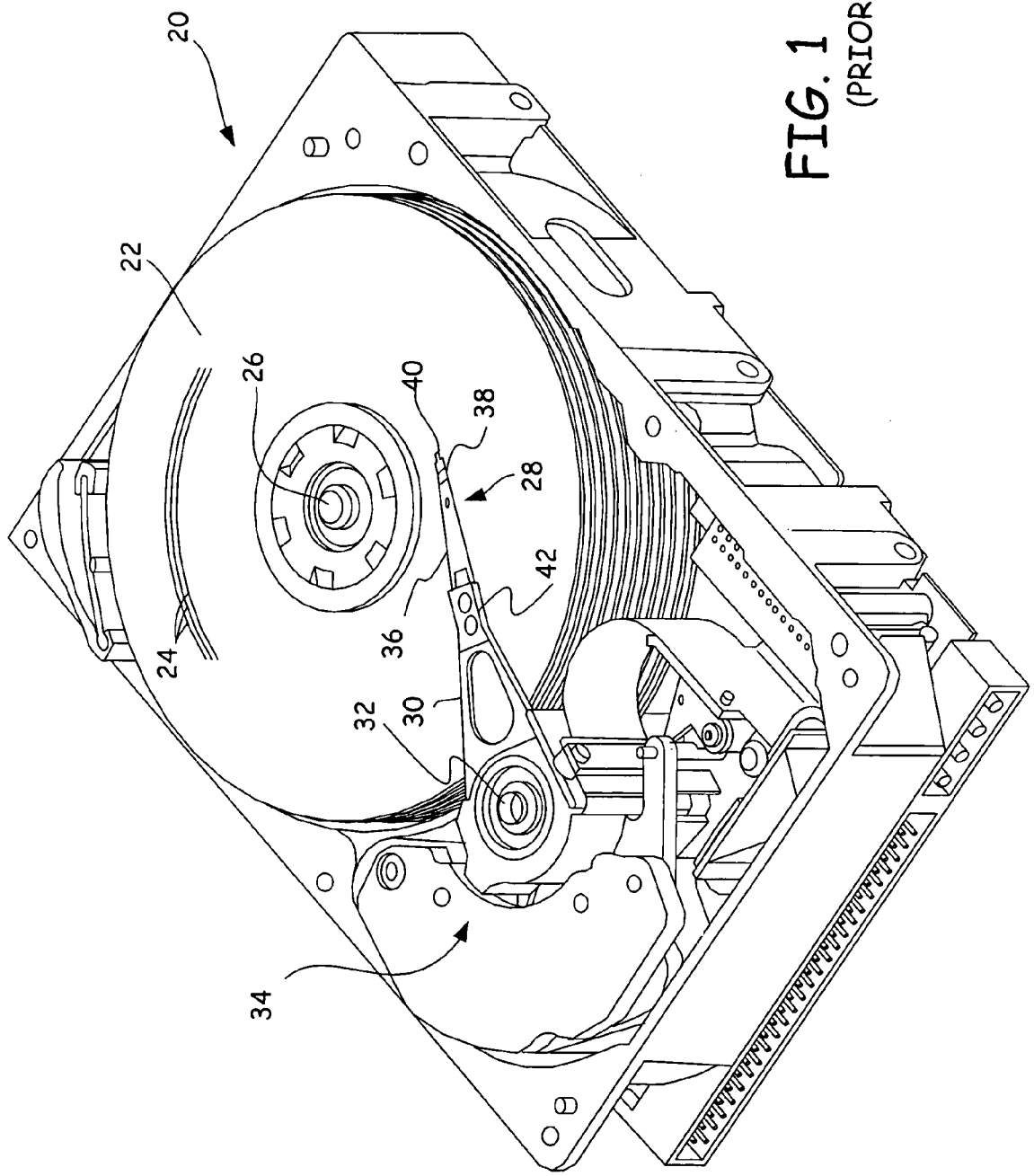
FIG. 1 is a perspective view of a prior art disc drive.

FIG. 1 is a perspective view of a prior art hard disc drive (HDD) system 20 for reading and/or writing to a magnetic storage medium, such as a disc 22 having a number of concentric data tracks 24. Disc 22 is rotatable about a spindle 26. A head gimbal assembly (HGA) 28 is supported by an actuator arm 30. Actuator arm 30 is connected to a pivot block housing 32. A large scale actuation motor, such as a voice coil motor (VCM) 34, is used to position actuator arm 30. HGA 28 comprises a load beam 36, a gimbal 38, a slider 40 and a base plate 42.

Disc 22 in FIG. 1 is rotatably supported by a spindle 26. In further embodiments of the present invention, disc 22 is located in a stack of axially-aligned discs of generally the same diameter. In operation, spindle 26 rotates disc 22 in a counter-clockwise direction. Data tracks 24 are accessed by positioning slider 40 over portions of rotating disc 22. VCM 34 rotates actuator arm 30, which in turn moves HGA 28 along an arc-shaped path. These movements allow slider 40 to be quasi-radially positioned above any of the concentric data tracks 24 located between an inner diameter and an outer diameter of disc 22.

In FIG. 1, actuator arm 30 is connected to pivot block housing 32. In further embodiments, multiple actuator arms are connected to a common pivot block housing. Pivot block housing 32 allows simultaneous positioning of multiple actuator arms relative to a stack of discs. Thus, data tracks on a number of disc surfaces can be accessed by corresponding actuator arm assemblies connected to rotatable pivot block housing 32.

Actuator arm 30 supports HGA 28. Load beam 36 of HGA 28 is attached to actuator arm 30 at a first end and to gimbal 38 at an opposite second end. Base plate 42 mechanically connects load beam 36 to actuator arm 30.

Gimbal 38 supports slider 40. Gimbal 38 is flexible to bias slider 40 for positioning close to disc 22. Slider 40 is aerodynamically designed such that airflow generated by rotation of disc 22 interacts with an air bearing surface (ABS) (not shown) of slider 40. This interaction allows slider 40 to "fly" a substantially constant distance above disc 22 on a small cushion of air. Slider 40 carries a transducing head (not shown).

The present invention relates to a clean suspension assembly for capturing particles carried by airflow along the suspension assembly and reducing airflow excitation of the suspension assembly. The clean suspension assembly includes an opening formed in the suspension assembly, and a lightweight airflow control device attached to the suspension assembly. In a further embodiment, the suspension assembly also includes a deflector located adjacent the opening. The opening and the lightweight airflow control device may be located anywhere along the suspension assembly. The lightweight airflow control device filters airflow by retaining particles carried in the airflow to reduce contamination of the suspension assembly. In addition, the clean suspension assembly reduces airflow excitation of the suspension assembly.

Figure 2:
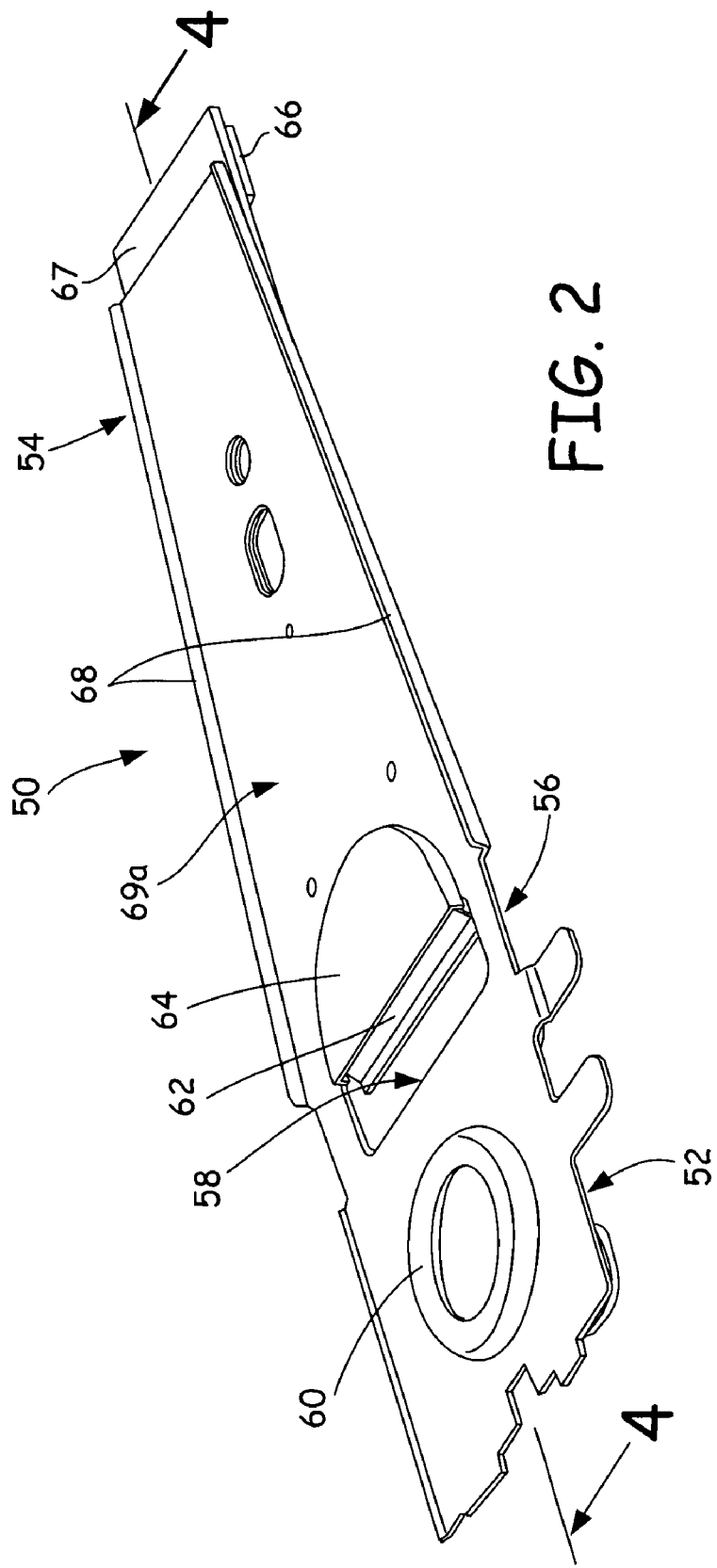
FIG. 2 is a top perspective view of a portion of a suspension assembly.
Figure 3:
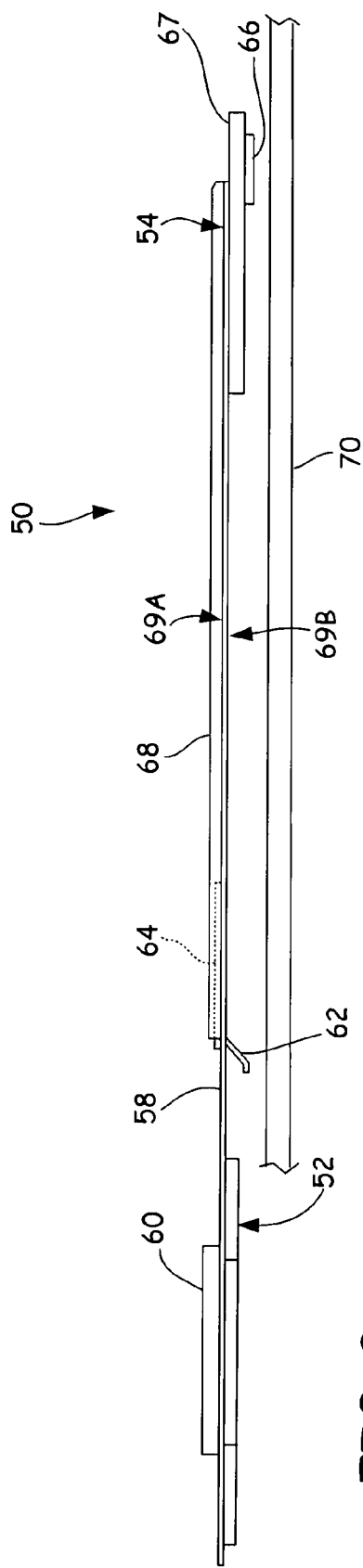
FIG. 3 is a side view of the portion of the suspension assembly shown in FIG. 2.

FIGS. 2–6 illustrate one embodiment of the present invention. FIG. 2 is a top perspective view of a portion of a suspension assembly, including a load beam 50. A side view of load beam 50 is shown in FIG. 3. Load beam 50 has an arm attachment region 52 and a gimbal attachment region 54 opposite the arm attachment region 52. A preload bent region 56 is located between the arm attachment region 52 and the gimbal attachment region 54. An opening 58 is located in the suspension assembly at preload bent region 56. A swage hole 60 is located in arm attachment region 52. A deflector 62 is attached to the suspension assembly, and in particular, attached to load beam 50 adjacent the opening 58. A particle capture device 64 is attached to the suspension assembly, and in this embodiment attached to load beam 50.

A slider 66 is supported by a gimbal 67, which is connected to load beam 50 at gimbal attachment region 52. A pair of rails 68 extend along load beam 50. Load beam 50 has a top surface 69a and an opposite disc-opposing surface 69b positioned relative a storage medium, such as a disc 70, shown in FIG. 3.

Opening 58 is provided in preload bent region 56 of load beam 50 to reduce a mass of load beam 50. Opening 58 is synonymously referred to as a vent, a mass-reducing hole, or a weight-reducing hole. In further embodiments of the present invention, a plurality of openings are provided along load beam 50. In yet further embodiments, opening 58, deflector 62, and particle capture device 64 are disposed in other locations on load beam 50. Opening 58 can be located almost anywhere along load beam 50, and deflector 62 and particle capture device 64 are correspondingly located relative opening 58.

Deflector 62 is located adjacent opening 58, as seen in FIG. 2. Deflector 62 extends outward from disc-opposing surface 69b of load beam 50. When load beam 50 is used in an HDD system, deflector 62 would extend from load beam 50 towards disc 70. A clearance height is provided between deflector 62 and disc 70. This clearance height prevents undesired contact between deflector 62 and sensitive surface areas of disc 70. Moreover, the clearance height allows some airflow to pass between deflector 62 and disc 70 to permit a slider to properly fly above disc 70. Deflector 62 is also referred to as a spoiler, and those terms are used interchangeably.

In further embodiments, deflector 62 is formed integrally with load beam 50. During manufacturing, it is possible to give deflector 62 nearly any shape. Deflector 62 may initially be formed during a stamping or other well-known process as a tab or similar structure extending into opening 58, the tab then being bent to extend outward from load beam 50 during the suspension bending process.

Load beam 50 in FIG. 2 is used in an HGA, as part of a suspension assembly. Swage hole 60 allows mechanical attachment of load beam 50 to an actuator arm. Gimbal attachment region 54 allows a gimbal to be attached to load beam 50 opposite the actuator arm, through well-known methods such as spot welding.

As disc 70 rotates in an HDD system, airflow develops near a surface of disc 70 and generally co-rotates with disc 70. When load beam 50, shown in FIGS. 2 and 3, is positioned proximate rotating disc 70, the airflow passes load beam 50. Some airflow along disc-opposing surface 69b of load beam 50. This airflow carries one or more particles. The airflow and the particles contained therein each present obstacles to error-free operation of the HDD.

Airflow, or windage, traveling along load beam 50 becomes turbulent. It is well-known that structures having holes or openings are subject to greater windage excitation than structures without holes. Opening 58 generates turbulence. Turbulence causes excitation of load beam 50, and, in turn, causes excitation of the entire HGA. Excitation of the HGA causes off-track movements and produces HDD errors. Additionally, as airflow passes near opening 58, eddies and other asymmetrical airflows develop at or near load beam 50. These asymmetrical airflows can also migrate to a wake region of load beam 50, downstream from opening 58, and further generate turbulence that excites the HGA.

Deflector 62 is positioned to deflect airflow along load beam 50, thereby reducing excitation of load beam 50. As airflow travels along load beam 50, deflector 62 mechanically diverts the airflow. Deflector 62 thus directs airflow away from sensitive areas (e.g. gimbal attachment region 54) to reduce excitation of load beam 50. Deflector 62 is oriented to deflect problematic airflow. For example, deflector 62 is shown in FIG. 2 oriented perpendicular to a length of load beam 50. In further embodiments, deflector 62 may be oriented at any angle relative the length of load beam 50. Moreover, deflector 62 may be positioned anywhere adjacent opening 58 (i.e., on any side of opening 58). Those skilled in the art will recognize that the particular location and orientation of deflector 62 may be selected based on particular problematic airflow locations and orientations.

Airflow is diverted by deflector 62 to particle capture device 64. Particle capture device 64 filters airflow by retaining particles carried in the airflow. Particles are retained in one or more cavities in particle capture device 64. Clean airflow is permitted to pass through or out particle capture device 64. Particle capture device 64 thus reduces the number of airborne particles, thereby reducing the number of particles that could collect on the HGA and migrate to an ABS of slider 66.

Load beam 50 includes a pair of rails 68 along its length. Rails 68 extend from about the preload bent region 56 to about the gimbal attachment region 54 to improve a support strength by increasing rigidity along load beam 50. Slider 66 is attached to disc-opposing side 69b of load beam 50 at gimbal attachment region 54.

Figure 4:
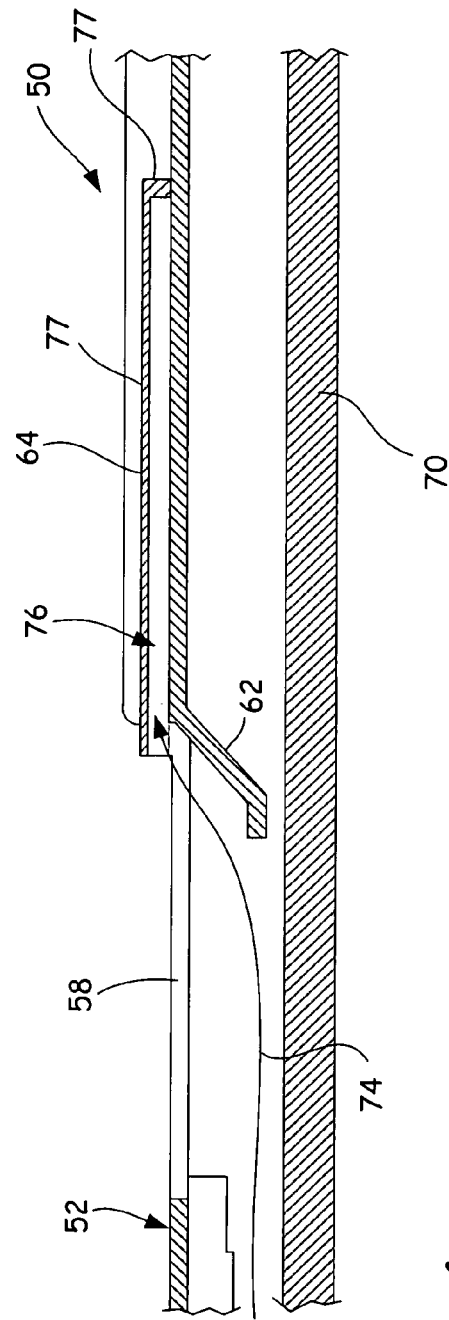
FIG. 4 is a cross-sectional view of a portion of the suspension assembly taken along line 4—4 of FIG. 2.

FIG. 4 is a cross-sectional view of a portion of load beam 50, taken along line 4—4 of FIG. 2. As seen in FIG. 4, deflector 62 extends from load beam 50 towards disc 70. A clearance of about 5–10 mils is provided between deflector 62 and disc 70. As disc 70 rotates, airflow travels along disc-opposing side 69b of load beam 50 carrying one or more particles. A substantial portion of the airflow along load beam 50 is diverted substantially along a path 74 by deflector 62, as described above. Deflector 62 diverts particles in the airflow from portions of the HGA where the particles could collect and cause contamination.

Airflow diverted by deflector 62 along path 74 travels through opening 58. Once airflow passes through opening 58, airflow is directed towards particle capture device 64. Particle capture device 64 has a core cavity 76. Airflow enters core cavity 76, and airborne particles are trapped and retained as airflow passes through a wall 77 of particle capture device 64. Particles are retained substantially inside core cavity 76 of particle capture device 64. In that manner, particle capture device 64 reduces the number of particles carried by the airflow, thereby, reducing the chance that particles that have collected on the HGA will migrate, influenced over time by gravity, windage, operating shock, and/or shock vibration, to the ABS of slider 66 causing contamination of the ABS.

FIG. 5 is a top view of the portion of the suspension assembly shown in FIG. 2, showing particle capture device 64 attached to load beam 50 adjacent to deflector 62. While deflector 62 extends from disc-opposing side 69b of load beam 50, particle capture device 64 is attached to the opposite top side 69a of load beam 50.

FIG. 6 is a bottom view of the portion of the suspension assembly shown in FIG. 2, showing load beam 50. In this embodiment, opening 58 is not covered by particle capture device 64. However, in an alternate embodiment of the present invention, the particle capture device 64 is adapted to cover opening 58.

As seen in FIGS. 2–6, particle capture device 64 partially overhangs opening 58. While such an overhang is not necessary to the present invention, positioning particle capture device 64 to overhang opening 58 is preferred to better allow airflow deflected by deflector 62 to enter core cavity 76 of particle capture device 64.

Another embodiment of the present invention is illustrated in FIGS. 7–8. FIG. 7 is a top perspective view of a portion of a suspension system that comprises an HGA 80, including a load beam 82. FIG. 8 is a bottom perspective view from the bottom of the portion of the suspension system shown in FIG. 7. Load beam 82 has a gimbal attachment region 84 and an arm attachment region 86. Load beam 82 has a top side 87a and an opposite disc-opposing side 87b. A large connection hole 88 and a pair of small connection holes 90 are provided in the arm attachment region 86. A gimbal 92 is attached to gimbal attachment region 84 of load beam 82. A slider 94 is supported by gimbal 92. A flexible interconnect circuit 96 is attached to disc-opposing side 87b of load beam 82. A particle capture device 98 is attached to top side 87a of load beam 82.

Load beam 82 is the main support structure of HGA 80, and HGA 80 is attached to an actuator arm (not shown) at arm attachment region 86 of load beam 82. Gimbal 92 is attached to gimbal attachment region 84 of load beam 82 by a spot weld, or other method known in the art. Particle capture device 98 is attached to top side 87a of load beam 82. Adhesives or other means known in the art are used to attach particle capture device 98 to load beam 82.

In operation, the rotating disc will generate an airflow. As HGA 80 is positioned to access data stored on the disc, airflow will travel along load beam 82 between HGA 80 and the disc. Particles in the airflow contaminate HGA 80. Moreover, the airflow causes turbulence that excites portions of HGA 80. Excitation of HGA 80 is undesirable because it can cause off track movements and lead to drive errors. Furthermore, airborne particles attach to portions of HGA 80.

Particle capture device 98 captures airborne particles traveling along load beam 82. A portion of the airflow traveling along disc-opposing side 87b of load beam 82 contacts particle capture device 98. Particle capture device 98 is constructed of well-known material for retaining particles.

FIG. 8 shows a bottom perspective of HGA 80. Located along load beam 82 are a number of mass-reducing holes 100, 102, 104, 106 and 108. Mass-reducing holes 100–108 allow load beam 82 to be constructed using less material, thereby reducing a mass of load beam 82. Load beams with reduced mass facilitate positioning HGA 80 above data tracks on a disc, as noted above with respect to the previous embodiment.

Particle capture device 98 is positioned to cover holes 100–108. It is well known that structures without holes are subject to less windage and excitation than structures having holes. Holes 100–108 in the load beam 82, if left uncovered, generate eddies, spiral vortexes and other asymmetrical airflows at the holes 100–108. These asymmetrical airflows originate at holes 100–108, and migrate downstream to a wake region adjacent HGA 80. Asymmetrical airflows cause turbulence, which in turn excite HGA 80 causing off-track movements. Because particle capture device 98 covers holes 100–108, HGA 80 has a quasi-solid shape that functionally resembles a structure without holes. Therefore, particle capture device 98 functions to reduce windage excitation of load beam 82, and in turn HGA 80, by limiting or eliminating airflow through holes 100–108 that causes asymmetric airflows.

Particle capture device 98 is constructed of lightweight filtration material. Any type of known lightweight filtration material could be used. Because the particle capture device 98 is constructed of a lightweight material, there is no mass penalty in covering holes 100–108. Weight-reducing qualities of holes 100–108 are retained, while the undesirable asymmetric airflows caused by holes 100–108 are reduced or eliminated.

Furthermore, particle capture device 98 captures airborne particles flowing along load beam 82. Holes 100–108 expose portions of particle capture device 98 to airflow along disc opposing side 87b of load beam 82. Particle capture device 98 thus reduces contamination of the ABS by capturing particles carried by the airflow before they are carried near gimbal attachment region 84 where the particles attach themselves to gimbal 92 and slider 94, thereby contaminating HGA 80.

While in the present embodiment particle capture device 98 is a single filter covering all the openings 100–108, multiple filters could be provided without departing from the spirit or scope of the present invention. For example, individual filters could be disposed to cover each of holes 100–108 separately. In the alternative, any number of filters could be used to cover nearly any combination of holes. Those skilled in the art will recognize that the amount of filter material used can be reduced, and thereby the mass of HGA 80, by limiting the amount of filter material attached to load beam 82 between holes 100–108.

Moreover, particle capture device 98 could be attached to either disc-opposing side 87b of load beam 82 or top side 87a of load beam 82 in further embodiments. Regardless of whether particle capture device 98 is attached to disc opposing side 87b or top side 87a of load beam 82, particle capture device 98 functions in the manner described above.

Figure 9:
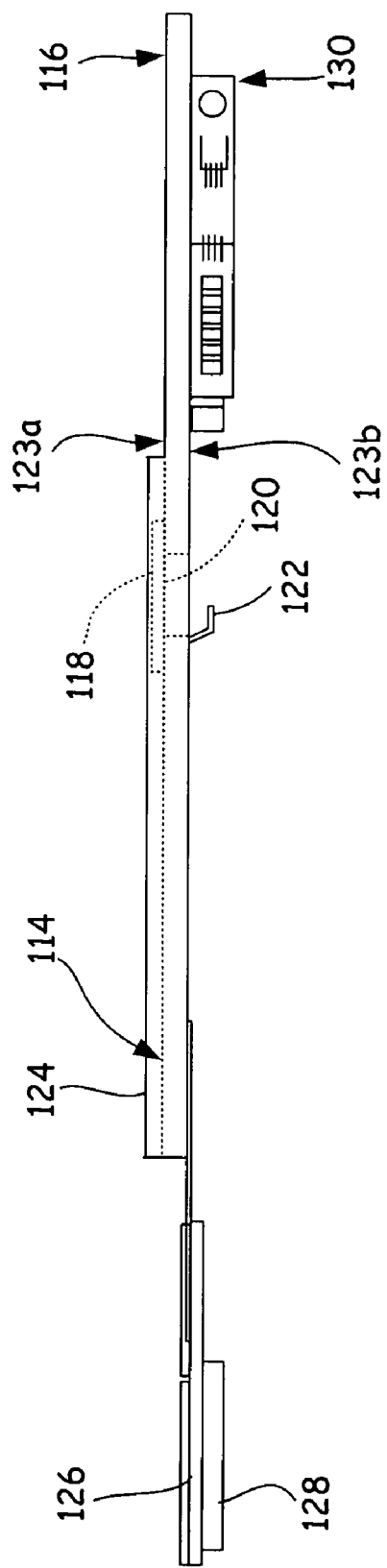
FIG. 9 is a side view of another embodiment of a suspension assembly.

FIG. 9 is a side view of a portion of another embodiment of a suspension assembly or HGA 110. HGA 110 comprises a load beam 112 having a gimbal attachment region 114 and an arm attachment region 116. A particle capture device 118, an opening 120, and a deflector 122 are located on load beam 112 between gimbal attachment region 114 and arm attachment region 116. Load beam 112 has a top side 123a and an opposite disc-opposing side 123b. A pair of rails 124, a gimbal 126, a slider 128, and a flexible interconnect circuit 130 are also located on load beam 112.

The HGA 110 is generally configured as with the previous embodiments. Deflector 122 extends from disc-opposing side 123b of load beam 122 adjacent opening 120. Deflector 122 diverts airflow along disc-opposing side 123b of load beam 112 toward particle capture device 118. Particle capture device 118 covers opening 120. Particle capture device 118 reduces excitation of HGA 110 due to asymmetric airflows and reduces contamination of HGA 110 due to airborne particles.

In further embodiments of the present invention, numerous openings are located along the load beam 112. Additional deflectors are optionally positioned relative to each opening.

Figure 10:
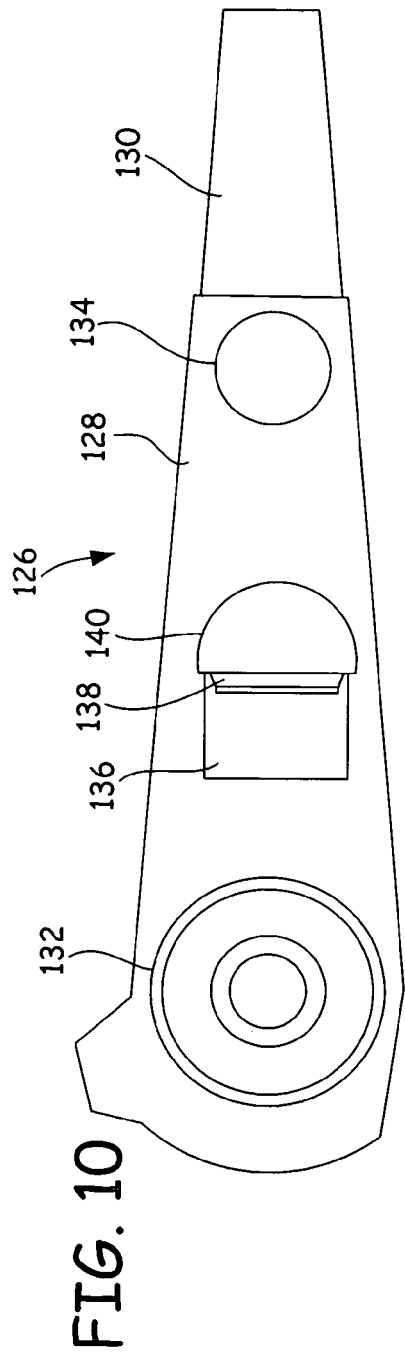
FIG. 10 is a top view of another embodiment of a suspension assembly.
Figure 11:
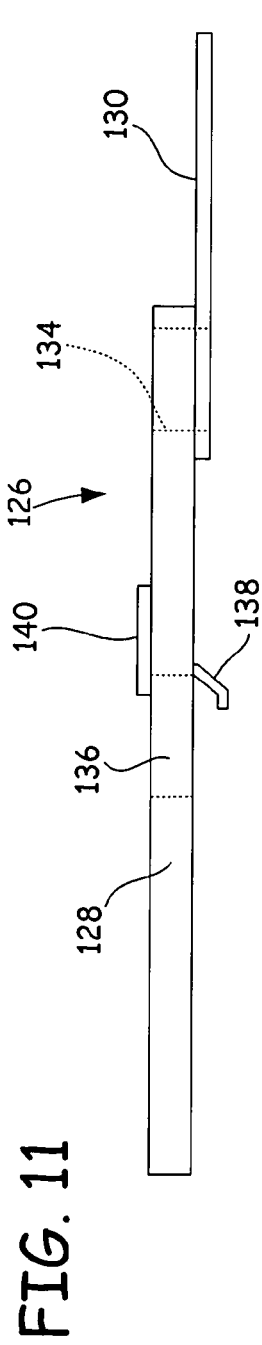
FIG. 11 is a side view of the suspension assembly shown in FIG. 10.

Individual features of the present invention can be located nearly anywhere along a suspension assembly. FIGS. 10 and 11 show another embodiment of a suspension assembly 126, which includes an actuator arm 128 and a load beam 130. Actuator arm 128 includes a pivot housing attachment 132, a swage hole 134, and an opening 136. A deflector 138 is located adjacent opening 136. A particle capture device 140 is attached to actuator arm 128 proximate opening 138. Load beam 130 is mechanically attached to actuator arm 128 at swage hole 134.

Suspension assembly 126 functions similar to that described with respect to previous embodiments. Particle capture device 140 and deflector 138 provide similar functionality whether attached to actuator arm 128 or to a load beam. As noted above, in further embodiments, particular locations and orientations of opening 136, deflector 138 and particle capture device 140 may be anywhere along actuator arm 128. Those skilled in the art will recognize that particular configurations selected are influenced by locations and orientations of particular airflows along the suspension (e.g. airflows along actuator arm 128).

Figure 12:
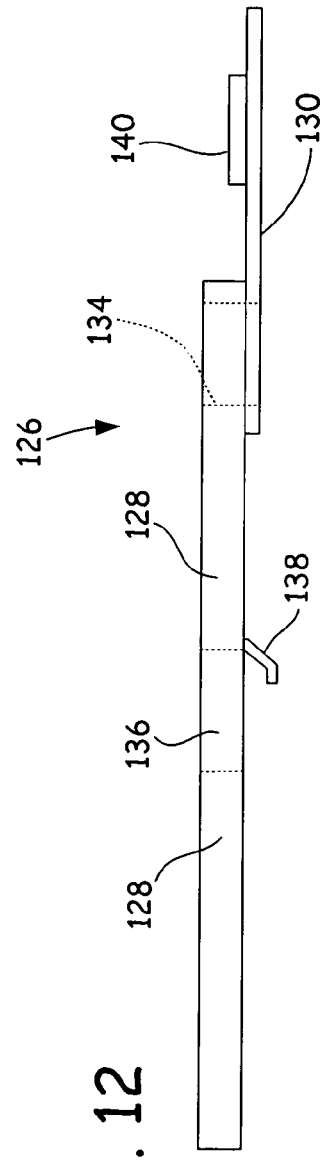
FIG. 12 is a side view of another embodiment of the suspension assembly.

FIG. 12 is a side view of another embodiment of suspension assembly 126. In this embodiment, opening 136 is located on actuator arm 128 and deflector 138 is attached to actuator arm 128 adjacent opening 136, and wherein particle capture device 140 is attached to load beam 130. Airflow is deflected by deflector 138, and travels along suspension assembly 126 to particle capture device 140. Deflector 138 and particle capture device 140 need not be adjacent each other to capture particles and reduce airflow excitation of suspension assembly 126. However, deflector 138 is generally located upwind of particle capture device 140.

Although the present invention has been described with reference to preferred embodiments, workers skilled in the art will recognize that changes may be made in form and detail without departing from the spirit and scope of the invention.

The invention claimed is:

1. A device for supporting a transducer with respect to a surface, the device comprising:
   a suspension assembly having a surface opposing side and an opposite top side;
   an opening formed in the suspension assembly; and
   a particle capture device attached to the suspension assembly, wherein the particle capture device is positioned adjacent the opening.

2. A device for supporting a transducer with respect to a surface, the device comprising:
   a suspension assembly having a surface opposing side and an opposite top side;
   a plurality of openings formed in the suspension assembly; and
   a unitary particle capture device attached to the suspension assembly, wherein the particle capture device covers at least two of the plurality of openings.

3. The device of claim 1 wherein the suspension assembly further comprises a load beam having an arm attachment region and an opposite gimbal attachment region, the particle capture device being attached to the load beam between the opening and the gimbal attachment region.

4. The device of claim 3, and further comprising:
   the opening located on the load beam;
   a deflector extending from the surface opposing side of the load beam, the deflector located adjacent the opening;
   wherein the particle capture device is attached to the top side of the load beam adjacent the deflector.

5. The device of claim 4 wherein the deflector directs airflow away from the surface opposing side of the load beam.

6. The device of claim 4 wherein the deflector directs airflow through the opening and to the particle capture device.

7. The device of claim 1, and further comprising:
   an actuator arm having a pivot housing attachment region and an opposite beam attachment region;
   the opening located on the actuator arm;
   a deflector extending from the surface opposing side of the actuator arm, the deflector located adjacent the opening;
   wherein the particle capture device is attached to the actuator arm adjacent the deflector.

8. The device of claim 1, and further comprising an actuator arm, a load beam supported by the actuator arm, and a deflector, wherein the opening is located on the actuator arm and deflector is attached to the actuator arm adjacent the opening, and wherein the particle capture device is attached to the load beam.

9. A suspension comprising:
   a suspension assembly having a first side and an opposite second side, the suspension assembly including a load beam and an actuator arm;
   a vent located on the suspension assembly; and
   a lightweight airflow control device attached to the suspension assembly for controlling excitation of the suspension assembly caused by asymmetric airflow patterns originated at the vent, and further for capturing contaminants.

10. The suspension of claim 9, and further comprising a deflector adjacent to the vent, the deflector extending from the first side of the suspension assembly for directing airflow and particles toward the airflow control device.

11. The suspension of claim 10 wherein the vent and the particle control device are located anywhere along the suspension assembly.

12. The suspension of claim 9 wherein the airflow control device comprises an airflow filter attached to the second side of the suspension assembly.

13. The suspension of claim 9 wherein the vent and the airflow control device are located on the actuator arm of the suspension assembly.

14. The suspension of claim 9 wherein the vent and the airflow control device are located on the load beam of the suspension assembly.

15. The suspension of claim 9 wherein the vent is located on the actuator arm of the suspension assembly and the airflow control device is located on the load beam of the suspension assembly.

16. An improved suspension having an opening, a media opposing face, and an opposite top face, wherein the improvement comprises:
   a spoiler on the suspension adjacent the opening for deflecting airflow traveling along the suspension; and
   a particle capture device attached to the suspension.

17. The suspension of claim 16 wherein the spoiler extends from the media opposing face of the suspension.

18. The suspension of claim 16 wherein the suspension further comprises a load beam, the load beam comprising:
   an arm attachment region;
   a gimbal attachment region opposite the arm attachment region; and
   a preload bent region located between the arm attachment region and the gimbal attachment region, wherein the opening is formed in the preload bent region of the load beam.

19. The suspension of claim 18 wherein the spoiler directs airflow away from a slider supported by the load beam at the gimbal attachment region.

20. The suspension of claim 18 wherein the particle capture device is attached to the load beam between the opening and the gimbal attachment region.

21. The suspension of claim 16 wherein the spoiler directs airflow toward the particle capture device.

22. The suspension of claim 16 wherein the particle capture device covers the opening.

23. The suspension of claim 16 wherein the particle capture device is attached to the top side of the load beam for reducing eddies generated at the opening.

24. The suspension of claim 16 wherein a mass of the suspension with the particle capture device is substantially the same as a mass of the suspension without the particle capture device.

* * * * *

UNITED STATES PATENT AND TRADEMARK OFFICE
CERTIFICATE OF CORRECTION

PATENT NO. : 7,075,753 B2 Page 1 of 1
APPLICATION NO. : 10/737494
DATED : July 11, 2006
INVENTOR(S) : David G. Wobbe et al.

It is certified that error appears in the above-identified patent and that said Letters Patent is hereby corrected as shown below:

Column 3, Line 45, delete "atop", insert --a top--

Signed and Sealed this

Twenty-sixth Day of December, 2006

JON W. DUDAS
*Director of the United States Patent and Trademark Office*